US008499814B2

(12) United States Patent
Ng

(10) Patent No.: US 8,499,814 B2
(45) Date of Patent: Aug. 6, 2013

(54) CHAIN LOCKING DEVICE FOR WINDOW BLIND CHAIN

(76) Inventor: Philip Ng, Thornhill (CA)

( * ) Notice: Subject to any disclaimer, the term of this patent is extended or adjusted under 35 U.S.C. 154(b) by 287 days.

(21) Appl. No.: 12/712,438

(22) Filed: Feb. 25, 2010

(65) Prior Publication Data

US 2010/0219311 A1 Sep. 2, 2010

Related U.S. Application Data

(60) Provisional application No. 61/156,087, filed on Feb. 27, 2009.

(51) Int. Cl.

| | |
|---|---|
| ***E06B 9/305*** | (2006.01) |
| ***E06B 9/386*** | (2006.01) |
| ***E06B 9/388*** | (2006.01) |
| ***E06B 9/00*** | (2006.01) |
| ***E06B 9/30*** | (2006.01) |
| ***A47H 1/00*** | (2006.01) |
| ***F16H 55/36*** | (2006.01) |

(52) U.S. Cl.
USPC ......... 160/173 R; 160/178.1 R; 160/168.1 R; 160/321; 474/171

(58) Field of Classification Search
USPC ............. 160/168.1 R, 168.1 V, 173 R, 173 V, 160/178.1 V, 178.1 R, 84.04, 321, 24, 344, 160/178.2; 474/136, 171; 254/391, 392
See application file for complete search history.

(56) References Cited

U.S. PATENT DOCUMENTS

| | | | | |
|---|---|---|---|---|
| 55,344 | A * | 6/1866 | Nell | 403/104 |
| 4,811,466 | A * | 3/1989 | Zubli | 24/115 G |
| 4,957,152 | A * | 9/1990 | Knight et al. | 160/345 |
| 5,752,558 | A * | 5/1998 | Lin | 160/320 |
| 6,085,824 | A * | 7/2000 | Cadorette | 160/177 V |
| 6,792,999 | B2 * | 9/2004 | Cross et al. | 160/321 |
| 7,114,544 | B2 * | 10/2006 | Rice et al. | 160/178.1 V |
| 7,931,069 | B2 * | 4/2011 | Cannaverde et al. | 160/173 R |
| 2006/0048907 | A1 * | 3/2006 | Rice et al. | 160/178.1 V |

* cited by examiner

*Primary Examiner* — Blair M Johnson
*Assistant Examiner* — Jaime F Cardenas-Garcia
(74) *Attorney, Agent, or Firm* — Elias Borges

(57) ABSTRACT

The invention is a chain locking mount for mounting the roller chain portion of a roller blind to a support surface such as a wall or window frame. The mount is configured to prevent the chain from being operated when the mount loosens from the support surface. The mount includes a housing with an aperture formed therein which is dimensioned to permit the roller chain to pass through the aperture. The mount further includes a lock member mounted adjacent the aperture, the lock member being movable between a locked position wherein the chain is prevented from moving through the aperture and an open position wherein the chain is free to move through the aperture. The mount is secured to the surface by a screw, the screw being coupled to the lock mechanism to retain the lock member in its open position when the screw is tightened to the surface. The lock member is biased towards its locked position so that the lock member moves towards its locked position when the screw is loosened from the surface.

6 Claims, 10 Drawing Sheets

CHAIN LOCKING DEVICE FOR WINDOW BLIND CHAIN

CROSS REFERENCE TO RELATED APPLICATION

This application claims the benefit of U.S. provisional application No. 61/156,087 filed Feb. 27, 2009, the entirety of which is incorporated herein by reference.

FIELD OF THE INVENTION

The invention relates generally to locking devices for locking a window blind chain.

BACKGROUND OF THE INVENTION

Window roller blinds generally use an elongated continuous chain to roll up and roll down the blind. The chain forms an elongated loop, one end of which is mounted to the roller blind and the opposite end of which depends down from the window blind where it can be reached by a user to raise or lower the blind by pulling on either side of the chain. If the lower end of the roller blind chain can be a chocking hazard for small children since it is possible for a child to accidentally insert his or her head through the lower end of the chain loop. To eliminate the risk of accidental chocking, the lower end of the window blind chain is secured to the wall or window frame by means of a roller chain mount which is secured to the wall. The roller chain mount secures the lower end of the roller chain against the wall or window frame and applies a small amount of tension against the lower end of the window blind chain to ensure that the chain is taught. Unfortunately, during normal operation of the wind blind chain, the roller chain mount has a tendency to come loose from the wall, leaving the lower end of the chain free. Users have a tendency to leave the chain mount unattached for extended periods of time; thereby increasing the risk that a child may accidentally choke on the end of the chain. An improved roller chain mount is therefore required.

SUMMARY OF THE INVENTION

In accordance with one aspect of the present invention, there is provided a mount which is securable to a surface which is configured to secure an end of a roller chain of a roller blind to the surface, the mount being configured to prevent the chain from being operated when the mount loosens from the surface. The mount includes a housing with an aperture formed therein which is dimensioned to permit the roller chain to pass through the aperture. The mount further includes a lock member mounted adjacent the aperture, the lock member being movable between a locked position wherein the lock member prevents the chain from moving through the aperture and an open position wherein the chain is free to move through the aperture. The mount is secured to the surface by a screw, the screw being coupled to the lock mechanism to retain the lock member in its open position when the screw is tightened to the surface. The lock member is biased towards its locked position so that the lock member moves towards its locked position when the screw is loosened from the surface.

With the foregoing in view, and other advantages as will become apparent to those skilled in the art to which this invention relates as this specification proceeds, the invention is herein described by reference to the accompanying drawings forming a part hereof, which includes a description of the preferred typical embodiment of the principles of the present invention.

DESCRIPTION OF THE DRAWINGS

In the drawings like characters of reference indicate corresponding parts in the different figures.

DETAILED DESCRIPTION OF THE INVENTION

Figure 1:
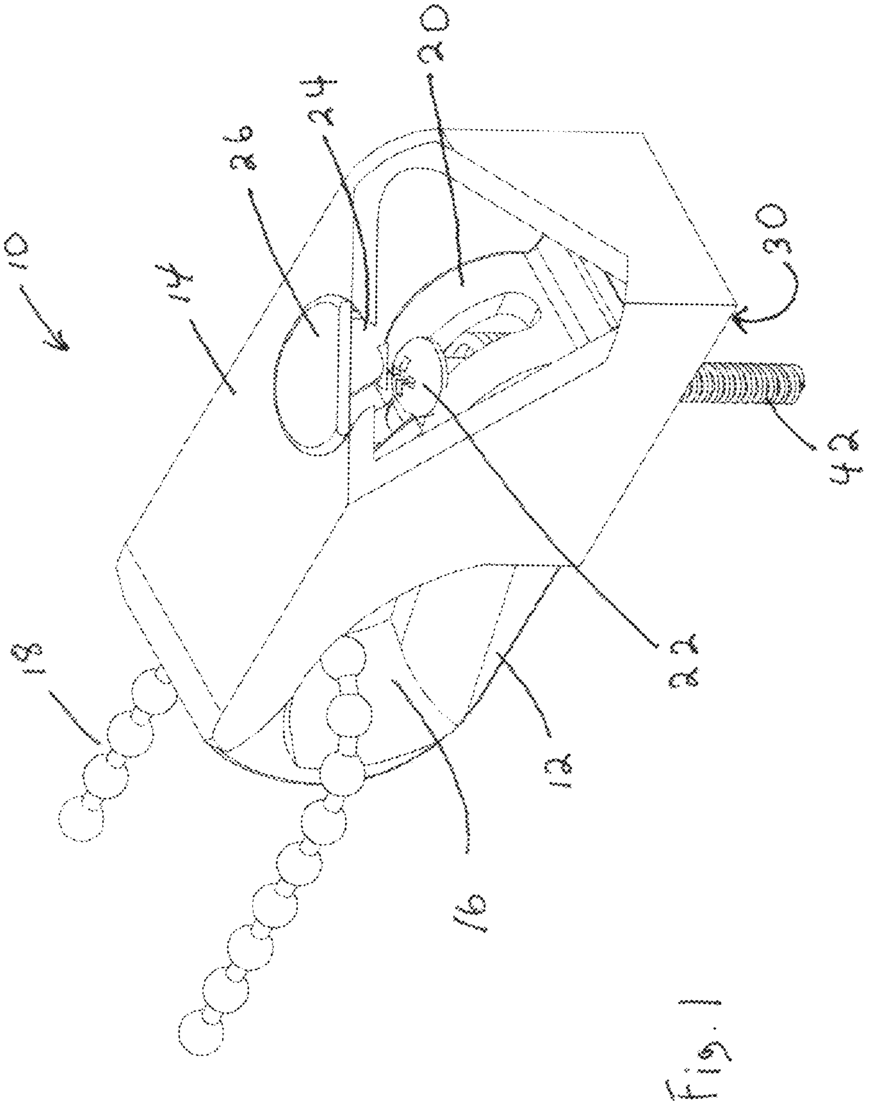
FIG. 1. is a perspective view of a chain mount made in accordance with the present invention and showing the chain mount in its unlocked configuration and further showing a portion of the mount's outer housing removed.
Figure 4:
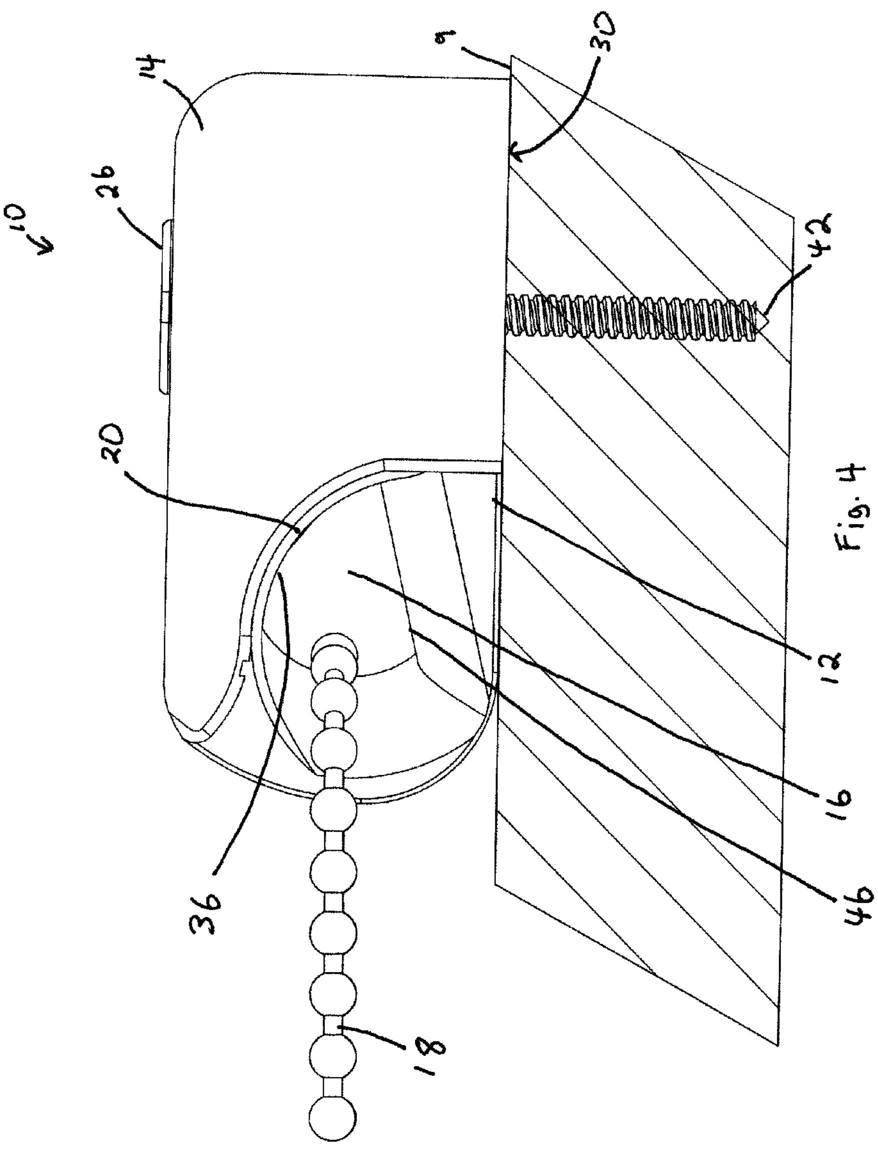
FIG. 4 is a side view of the chain mount shown in FIG. 1 in its unlocked configuration.
Figure 5:
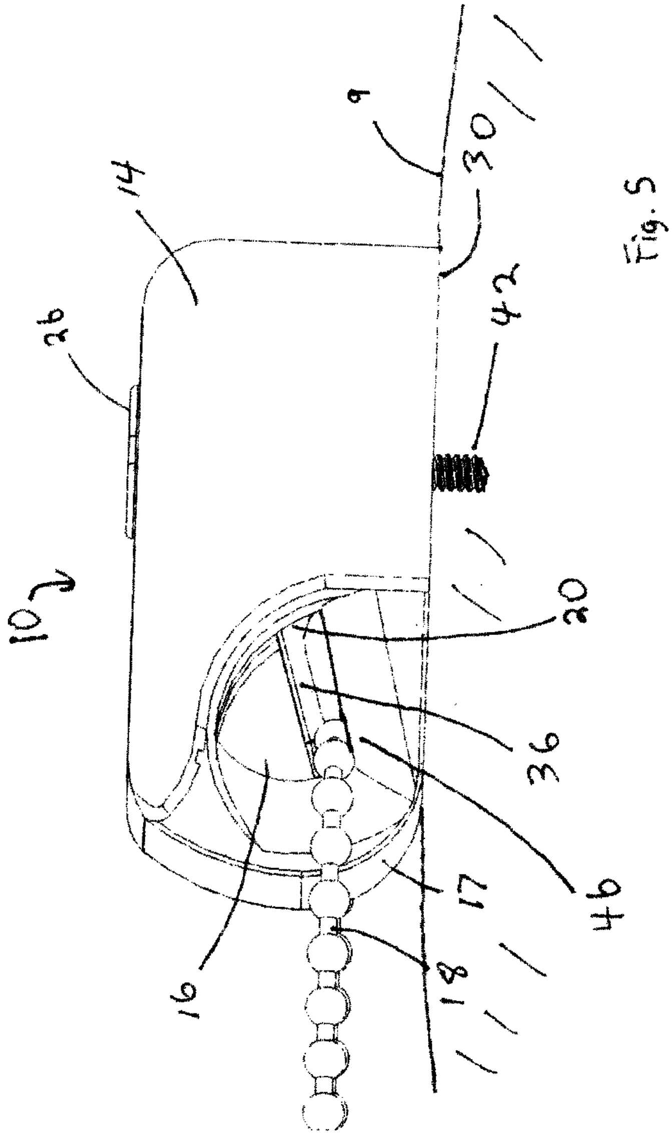
FIG. 5 is a side view of the chain mount shown in FIG. 4 in its locked configuration.

Referring firstly to FIG. 1, a chain mount made in accordance with the present invention is shown generally as item 10 and consists of a housing 12 having an aperture 16 formed therein which is dimensioned to permit roller chain 18 to move through the aperture so as to allow a user to pull on the chain to raise and lower the roller blind (not shown). The mount has a bottom surface, 30 which is configured to lay against a support surface (not shown) such as a wall or window frame. The mount also includes a lock member 20 which is mounted adjacent aperture 16 and is movable between a locked position as shown in FIG. 5 wherein the lock member prevents chain 18 from passing through aperture 16 and an unlocked or open position as shown in FIG. 4 where the chain is free to pass through aperture 16. Screw 22 is used to secure mount 10 to the surface (not shown) and to hold lock member 20 it its unlocked (open) position when the screw is fully tightened to the surface. Screw 22 has end 42 which screws into the surface (not shown) when the screw is engaged. Housing cover 14 is configured to mount to housing 12 and contain screw 22 and a portion of lock member 20. Housing cover 14 has aperture 24 through which a user can access screw 22 and a cap 26 which covers over aperture 24.

Figure 2:
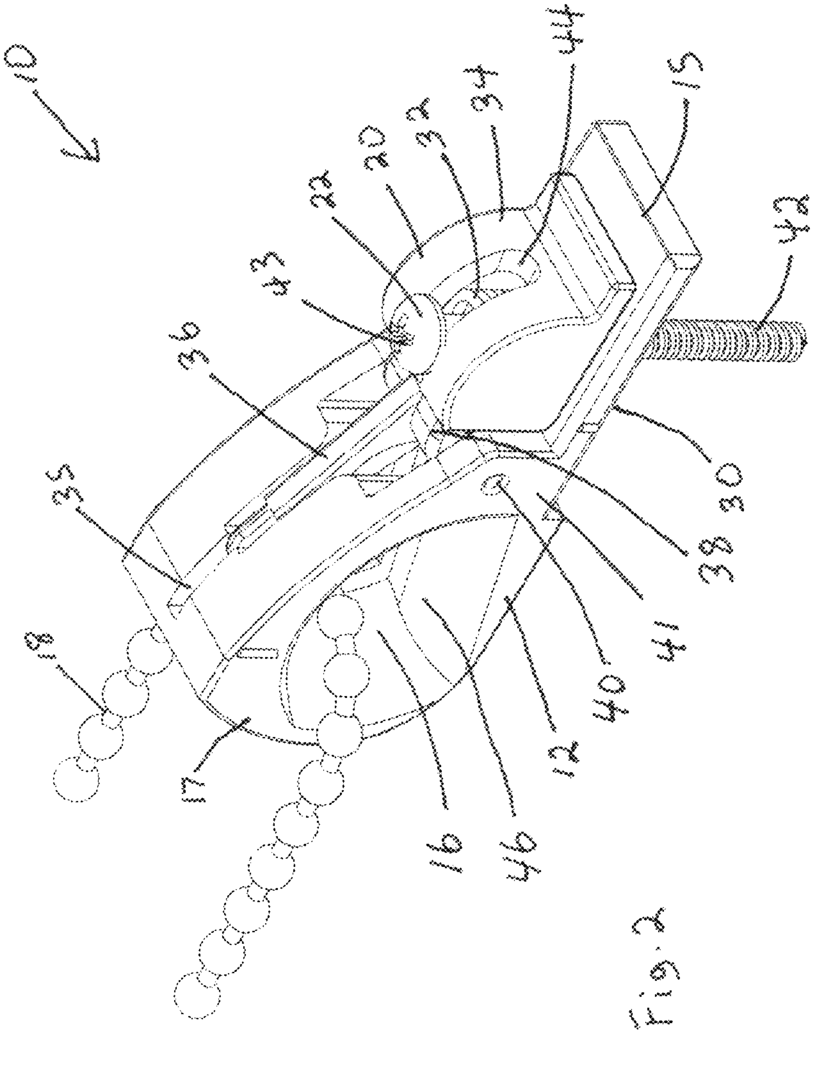
FIG. 2 is a perspective view of the chain mount shown in FIG. 1 with the outer housing removed.
Figure 3:
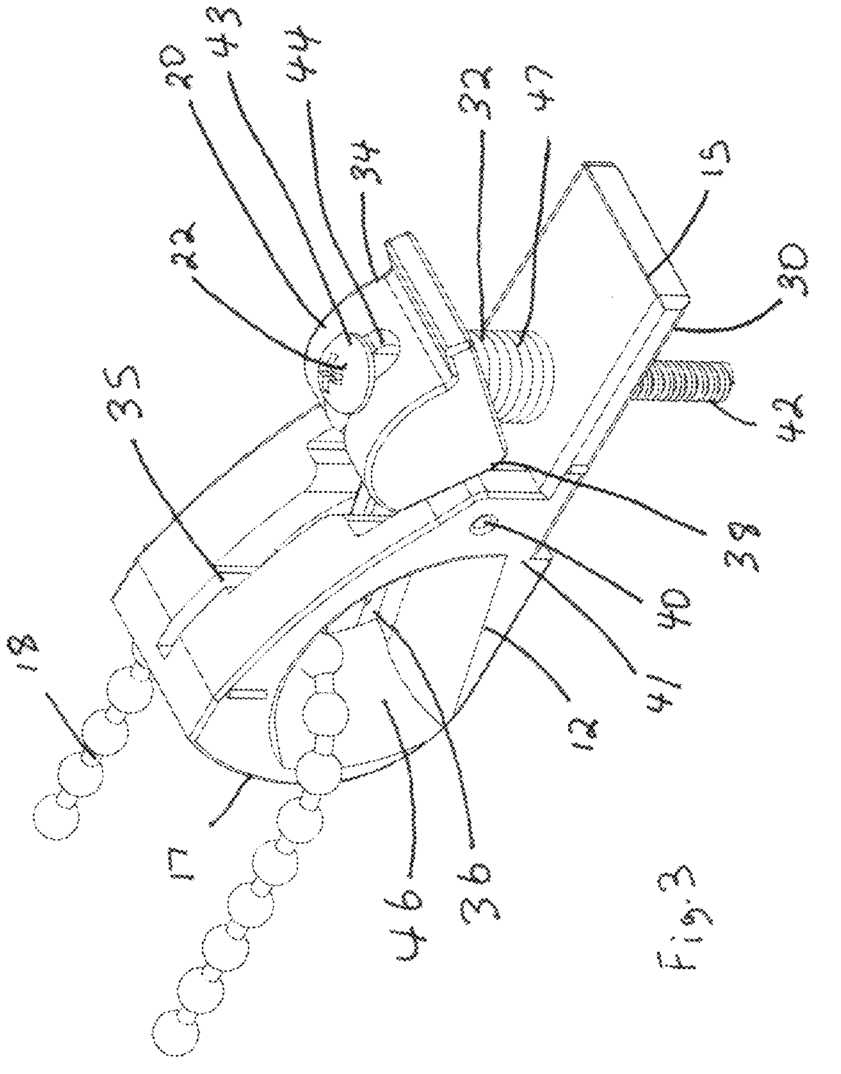
FIG. 3 is a perspective view of the chain mount shown in FIG. 2 with the mount in its locked configuration.

Referring now to FIGS. 2 and 3, housing 12 has opposite ends 15 and 17 with aperture 16 being formed on end 17 and middle portion 41 positioned between the opposite ends. Lock member 20 has opposite ends 36 and 34 on either side of middle portion 38 which is pivotally connected to middle portion 41 of housing 12 by pivot element 40 such that the lock member can pivot between its unlocked position as shown in FIG. 2 to its locked position as shown in FIG. 3. Screw 22 has head 43 and screw tip 42. End 15 of housing 12 has an aperture 47 (see FIG. 3) which is dimensioned to receive screw tip 42. End 34 of lock member 20 has opening 44 dimensioned to permit screw tip 42 to pass through, but not screw head 43. Biasing spring 32 is positioned between end 34 of lock member 20 and end 15 of housing 12. Biasing spring 32 is configured to bias lock member 20 towards its locked position, and preferably comprises a helical compression spring; however, several other spring configurations such as spiral springs and the like can be used to bias the lock member towards its locked position. When screw 22 is tightened into the support surface (not shown) to firmly secure mount 10 to the surface, screw head 43 is moved towards end 15 of housing 12, thereby forcing end 34 of lock member towards housing end 15 which in turn moves end 36 away from housing portion 46 adjacent aperture 16. Slot 35 is formed on housing end 17 to permit end 36 to move into its unlocked position as shown in FIG. 2.

As best seen in FIG. 3, when screw 22 is loosened, biasing spring 32 is able to force end 34 of lock member 20 away from end 15 of housing 12, which in turn forces end 36 of the lock member towards portion 46 of end 17 of the housing and into its locked position. As end 36 of lock member 20 moves into its locked position, it traps chain 18 between end 36 and portion 46, preventing the chain from passing through aperture 16.

As seen in FIGS. 4 and 5, when screw tip 42 is fully inserted into surface 9 end 36 of the lock member is clear of portion 46 adjacent aperture 16 and chain 18 can freely pass through the aperture. When the screw tip is fully secured in surface 9, the user can easily pull on chain 18 to raise or lower the roller blind (not shown). However, as seen in FIG. 5, when the screw begins to loosen, screw tip 42 does not engage deeply into surface 9, permitting end 36 of the spring biased lock member to move towards portion 46 of housing end 17, trapping chain 18 between end 36 and portion 46. With chain 18 thus trapped, the chain can no longer pass through aperture 16, preventing the user from pulling on the chain to raise or lower the roller blind (not shown). The only way to make the chain usable again is to secure the screw tightly to surface 9 is to remove cap 26 and then turn the screw with a screw driver (not shown) to force screw tip 42 deeper into surface 9 and thereby permit end 36 of the lock member to move into its unlocked position. The length of the screw is selected to be sufficiently long to ensure that the tip of the screw is still engaged partially in the support surface when the lock mechanism moves into its locked position. In this way, the chain mount is placed in its locked orientation while the screw only loosely mounts the chain mount to the support surface. The chain mount of the present invention therefore compels the user to re-secure the chain mount to surface 9 by tightening the screw before the chain mount disengages from the support surface entirely, thereby lessening the chances of the chain posing a chocking hazard.

Figure 6:
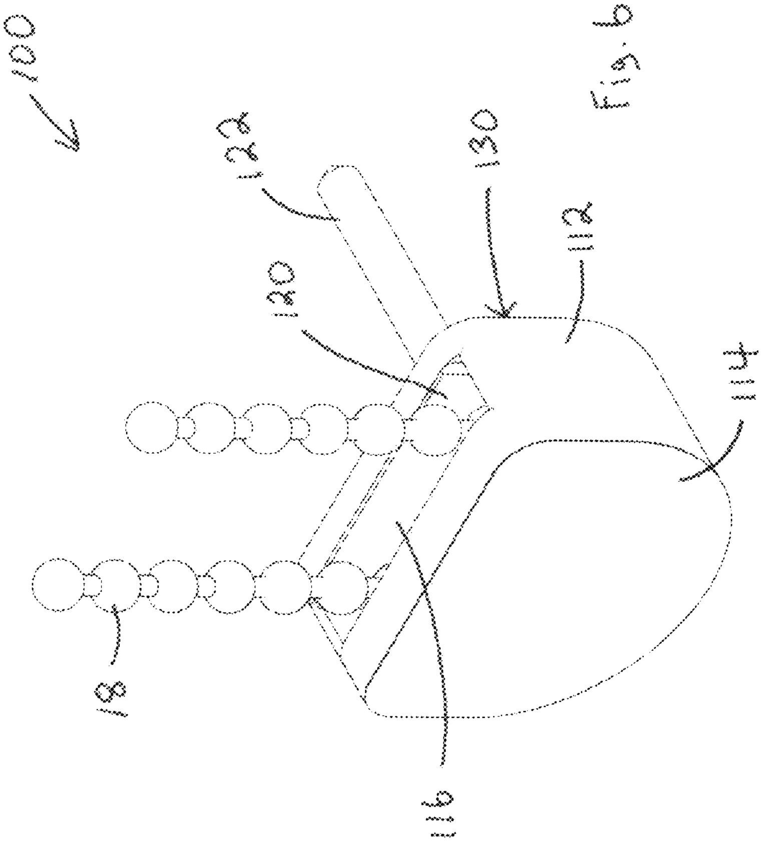
FIG. 6 is a perspective view of an alternate embodiment of a chain mount made in accordance with the present invention showing a portion of chain mounted thereto.
Figure 10:
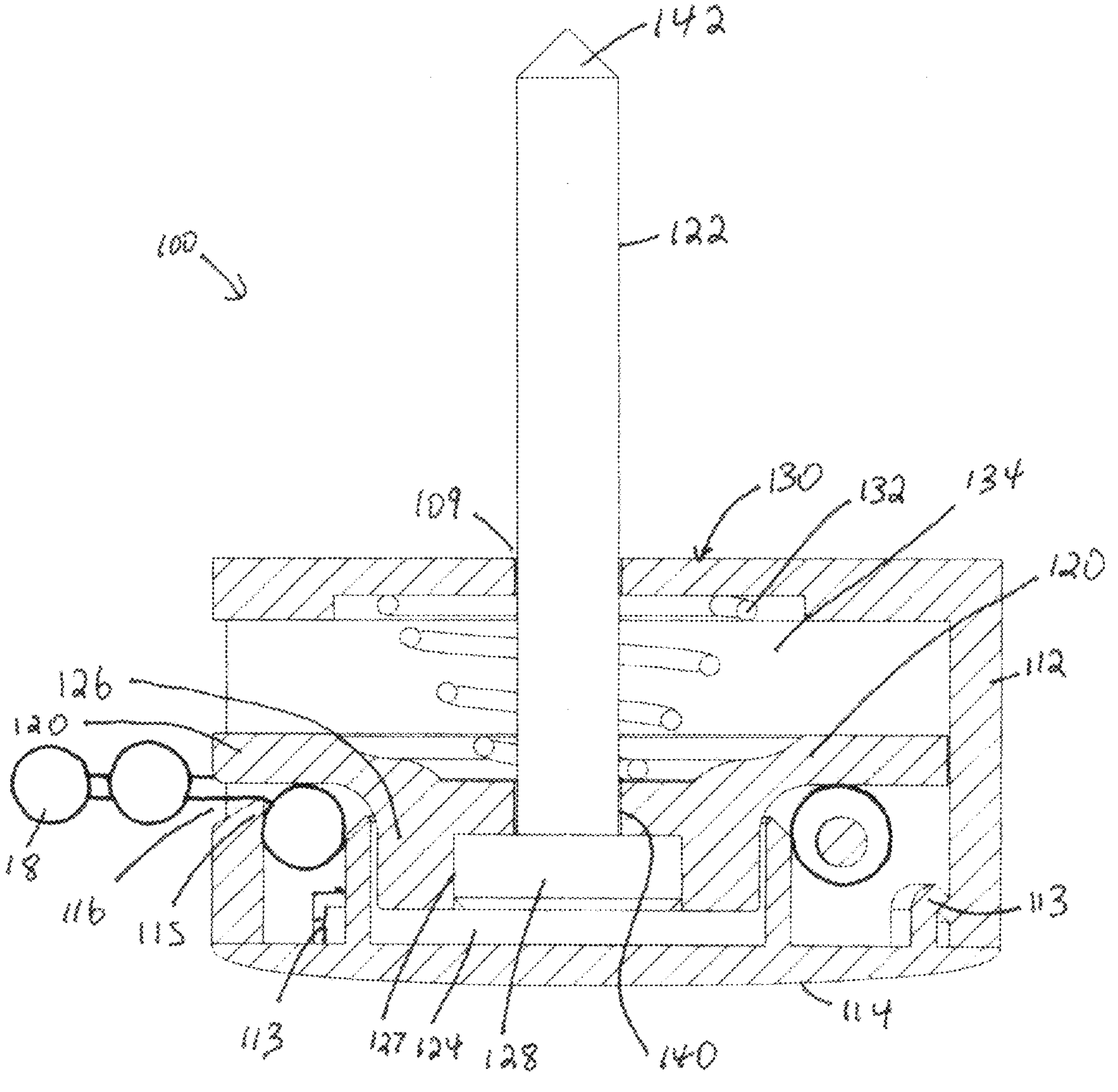
FIG. 10 is a sectional view of the chain mount shown in FIG. 6 showing the chain mount in its locked configuration.

Referring now to FIG. 6, an alternate embodiment of the present invention is shown generally as item 100 and includes a housing 112 having an aperture 116 formed therein which is dimensioned to permit roller chain 18 to move through the aperture so as to allow a user to pull on the chain to raise and lower the roller blind (not shown). The mount has a bottom surface, 130 which is configured to lay against a support surface (not shown) such as a wall or window frame. The mount also includes a lock member 120 which is mounted adjacent aperture 116 and is movable between a locked position as shown in FIG. 10 wherein the lock member prevents chain 18 from passing through aperture 116 and an unlocked or open position as shown in FIG. 7 where the chain is free to pass through aperture 116.

Figure 7:
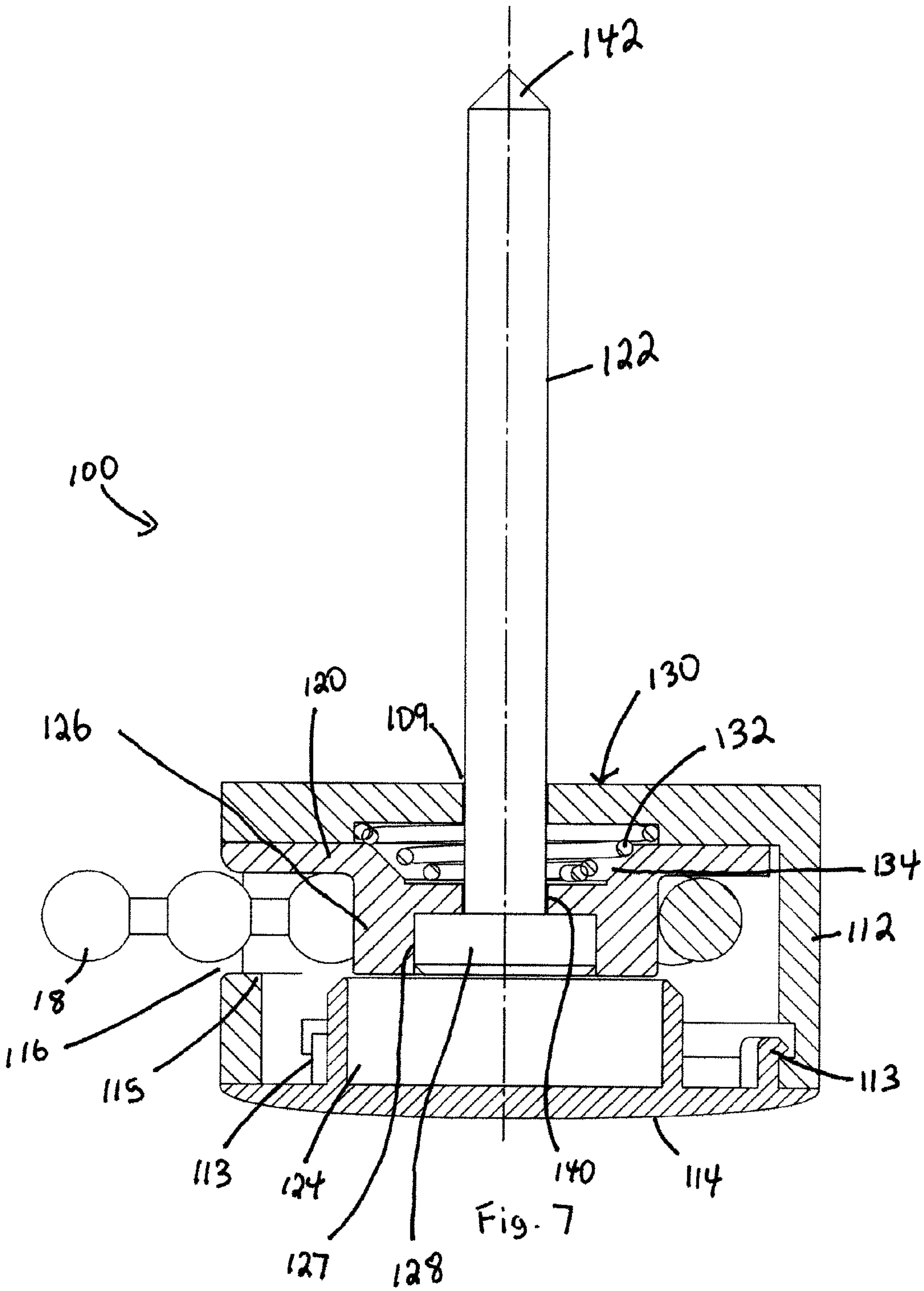
FIG. 7 is a sectional view of the chain mount shown in FIG. 6 showing the chain mount in its unlocked configuration.
Figure 8:
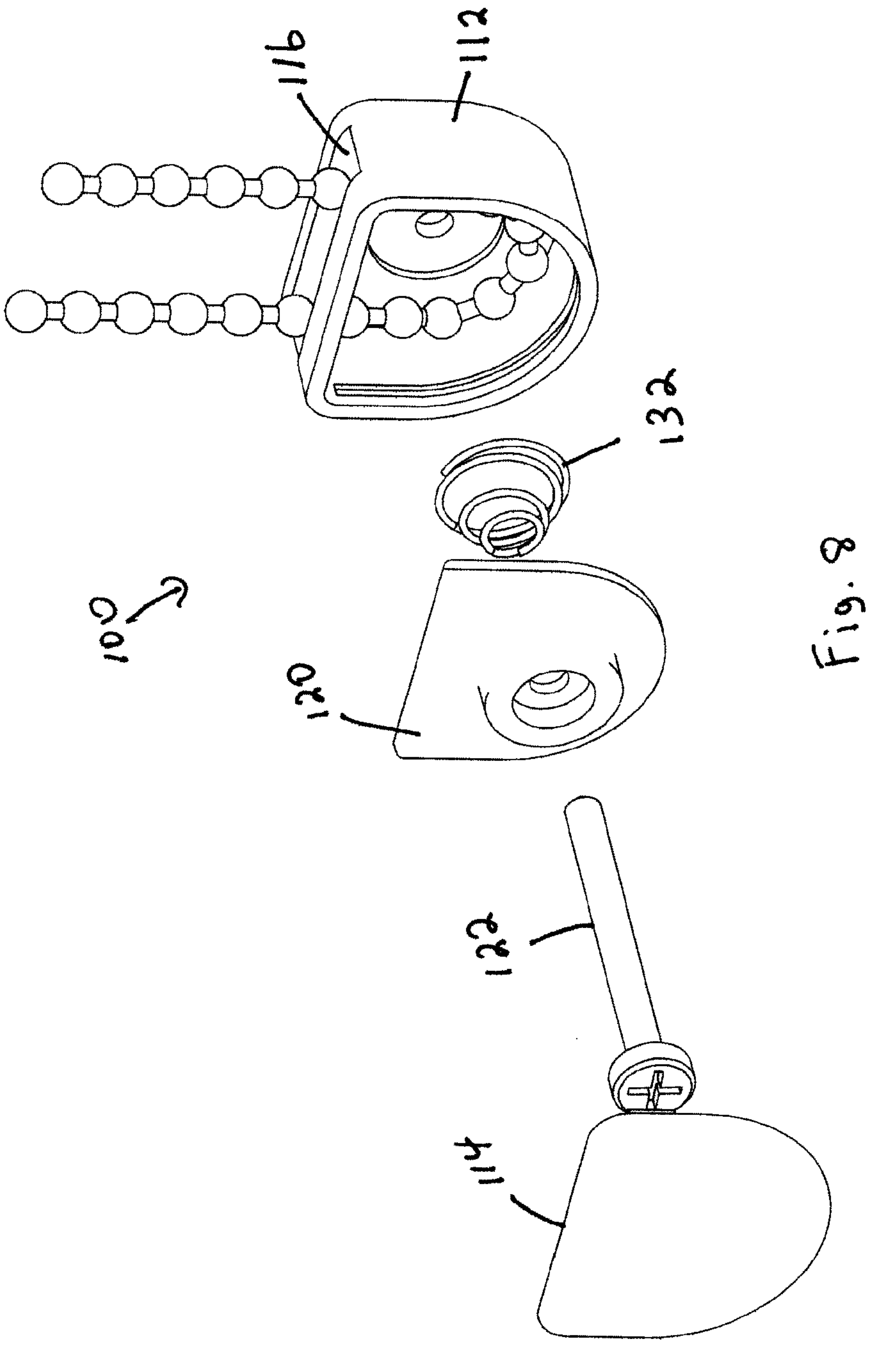
FIG. 8 is an exploded view of the chain mount shown in FIG. 6.
Figure 9:
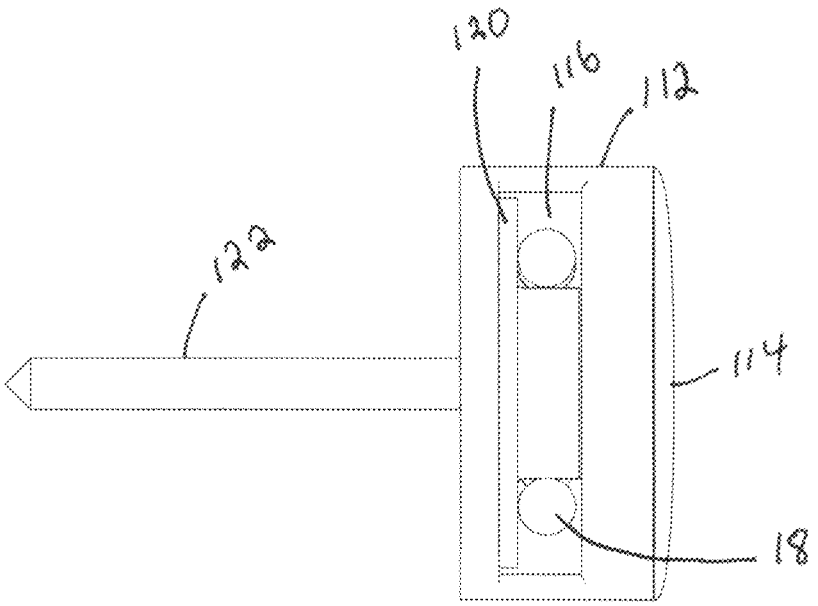
FIG. 9 is a top view of the chain mount shown in FIG. 6.

Referring to FIG. 7, screw 122 is used to secure mount 100 to the surface (not shown) and to hold lock member 120 it its unlocked (open) position when the screw is fully tightened to the surface. Screw 122 has end 142 which screws into the surface (not shown) when the screw is engaged. Housing cover 114 is configured to mount to housing 112 and contain screw 122 and a portion of lock member 120. Housing cover 114 has cup portion 124 which is configured to receive barrel portion 126 of lock member 120 to permit the lock member to move into its locking position. Housing cover 114 is configured to mount to housing 112 by snapping into place via hook portions 113.

Screw 122 has a screw head 128 which is configured to be received in recess 127 in barrel portion 126. Housing 112 has an aperture 109 through which screw 122 may pass. Biasing spring 132 is dimensioned to fit around screw 122 and between back wall 130 of housing 112 and lock member 120. Lock member 120 has a recess 134 which is dimensioned to receive spring 132. Spring 132 biases lock member 120 towards housing cover 114. Barrel portion 126 of lock member 120 is configured to be received into recess 124 of housing cover 114. Additionally, barrel portion 126 acts to guide the movement of chain 18 as it passes through chain mount 100 when the chain mount is in its unlocked orientation.

To mount chain 18 using chain mount 100, the chain mount is first partially assembled by positioning spring 132 between back wall 130 of housing 112 and lock member 120 as shown in FIG. 7. Lock member 120, housing 112 and spring 132 are oriented such that the three portions are coaxially aligned. Chain 18 can then be passed through aperture 116 and around barrel portion 126. Screw 122 is then inserted through aperture 140 in lock member 120 and then through spring 132 and aperture 109. Screw 122 is then tightly screwed onto a support surface such as a wall or window frame (not shown) so that spring 132 is compresses sufficiently to permit chain 18 to pass through opening 116 without difficulty. The force of screw head 128 acting on lock member 120 is sufficient to keep chain mount 100 in its unlocked orientation so long as screw 122 is tightly screwed to the support surface (not shown). Housing cover 114 can then be mounted to housing 112 by snapping it into place. In the event screw 122 becomes loose or partially dislodged from the support surface to which it is screwed, biasing spring 132 will force lock member 120 towards housing cover 114 and thereby restrict opening 116 sufficiently to prevent chain 18 from passing through the chain mount as see FIG. 10. Also referring to FIG. 10, edge 115 of housing 112 adjacent opening 116 is configured to prevent beads 18 from passing through the opening when lock member 120 is in its locked position. Preferably edge 115 forms a sharp angle which acts as a ratchet preventing the beads of chain 18 from passing through opening (aperture) 116.

Preferably, screw 122 is dimensioned to be sufficiently long to ensure that tip 142 is still well within the support surface (not shown) and the chain mount is still mounted to the support surface when lock member 120 moves into its locked position. This ensures that the chain is locked well before the chain mount fully detaches from the support surface. The chain being locked by the chain mount acts as a warning that the chain mount is coming loose and must be tightened. When the home owner (or other) attempts to operate the chain he or she will notice that the chain is locked and will therefore take measures to re-secure the chain mount to the support surface (not shown) in order to operate the window covering with the chain.

A specific embodiment of the present invention has been disclosed; however, several variations of the disclosed embodiment could be envisioned as within the scope of this invention. It is to be understood that the present invention is not limited to the embodiments described above, but encompasses any and all embodiments within the scope of the following claims.

Therefore, what is claimed is:

1. A mount for securing an end of a roller chain of a roller blind to a surface, said mount comprising:

a housing;

an aperture formed on the housing, the aperture dimensioned to permit the roller chain to pass through the aperture;

a lock member mounted adjacent the aperture, the lock member being movable between a locked position wherein the chain is prevented from moving through the aperture and an unlocked position wherein the chain is free to pass through the aperture;

a screw for securing the mount to the surface, the screw being coupled to the lock member to move the lock member into its unlocked position when the screw is tightened to the surface, the housing, screw and lock member being configured to position the lock member in its unlocked position when the screw is fully tightened to the surface, and the lock member being biased towards its locked position so that the lock member moves towards its locked position when the screw is loosened from the surface;

a spring for biasing the lock member towards its locked position, and wherein the housing has a bottom portion configured to bear against the support surface, when the mount is screwed to the support surface, the housing, lock member, screw and spring all being aligned with the screw passing through the spring, the housing and the lock member, the spring being positioned between the lock member and the bottom portion.

2. The mount of claim 1 wherein the screw is dimensioned such that the screw holds the lock member in its unlocked position when the screw is screwed into the support surface and fully tightened thereon, the screw being further dimensioned to be sufficiently long such that the lock member moves into its locked position before the screw is fully loosened from the support surface.

3. The mount of claim 1 wherein a portion of the housing adjacent the aperture is configured to prevent the chain from passing through the aperture when the lock member is in its looked position.

4. A mount for securing an end of a roller chain of a roller blind to a surface, said mount comprising:

a housing;

an aperture formed on the housing, the aperture dimensioned to permit the roller chain to pass through the aperture;

a lock member mounted adjacent the aperture, the lock member being movable between a locked position wherein the chain is prevented from moving through the aperture and an unlocked position wherein the chain is free to pass through the aperture;

a screw for securing the mount to the surface, the screw being coupled to the lock member to move the lock member into its unlocked position when the screw is tightened to the surface, the housing and lock member being configured to hold the lock member in its unlocked position when the screw is fully tightened to the surface;

the lock member being biased towards its locked position by a spring so that the lock member moves towards its locked position when the screw is loosened from the surface;

the screw being dimensioned such that the screw holds the lock member in its unlocked position when the screw is screwed into the support surface and fully tightened thereon, the screw being further dimensioned to be sufficiently long such that the lock member moves into its locked position before the screw is fully loosened from the support surface;

the housing having a bottom portion configured to bear against the support surface when the mount is screwed to the support surface, the screw, spring, and the apertures of the housing and lock member all being aligned with the screw passing through the spring, housing and lock member, the spring being positioned between the lock member and the bottom portion of the housing.

5. A mount for securing an end of a roller chain of a roller blind to a surface, said mount comprising:

a housing;

an aperture formed on the housing, the aperture dimensioned to permit the roller chain to pass through the aperture;

a lock member mounted adjacent the aperture, the lock member being movable between a locked position wherein the chain is prevented from moving through the aperture and an unlocked position wherein the chain is free to pass through the aperture;

a screw for securing the mount to the surface, the screw being coupled to the lock member to move the lock member into its unlocked position when the screw is tightened to the surface, the housing and lock member being configured to hold the lock member in its unlocked position when the screw is fully tightened to the surface, and the lock member being biased towards its locked position by a spring so that the lock member moves towards its locked position when the screw is loosened from the surface, wherein the housing has a bottom portion configured to bear against the support surface when the mount is screwed to the support surface, the housing, lock member, screw and spring all being aligned with the screw passing through the spring, the housing and the lock member, the spring being positioned between the lock member and the bottom portion.

6. The mount of claim 5 wherein a portion of the housing adjacent the aperture is configured to prevent the chain from passing through the aperture when the lock member is in its locked position.

* * * * *